(12) United States Patent
Yin

(10) Patent No.: US 8,237,866 B2
(45) Date of Patent: Aug. 7, 2012

(54) SYSTEM AND METHOD FOR PHASE MOTION DETECTION FOR YC SEPARATION

(75) Inventor: Patricia Chiang Wei Yin, Singapore (SG)

(73) Assignee: STMicroelectronics, Inc., Carrollton, TX (US)

( * ) Notice: Subject to any disclaimer, the term of this patent is extended or adjusted under 35 U.S.C. 154(b) by 425 days.

(21) Appl. No.: 12/592,766

(22) Filed: Dec. 2, 2009

(65) Prior Publication Data

US 2010/0165209 A1    Jul. 1, 2010

(30) Foreign Application Priority Data

Dec. 31, 2008  (SG) ................. 200809682-8

(51) Int. Cl.
*H04N 9/78* (2006.01)
(52) U.S. Cl. ........ 348/669; 348/665; 348/663; 348/668; 348/667; 348/670; 348/705; 348/666; 348/155
(58) Field of Classification Search .......... 348/669, 348/665, 663, 668, 667, 670, 705, 666, 155
See application file for complete search history.

(56) References Cited

U.S. PATENT DOCUMENTS

| | | | | |
|---|---|---|---|---|
| 4,597,007 A * | 6/1986 | Reitmeier et al. | ............ | 348/670 |
| 5,339,113 A * | 8/1994 | Iwasaki | ............ | 348/604 |
| 5,457,501 A * | 10/1995 | Hong | ............ | 348/668 |
| 5,502,509 A | 3/1996 | Kurashita et al. | | |
| 5,534,933 A * | 7/1996 | Yang | ............ | 375/240.01 |
| 5,808,701 A * | 9/1998 | Lee | ............ | 348/712 |
| 6,175,389 B1 | 1/2001 | Felts, III et al. | | |
| 6,288,754 B1 * | 9/2001 | Ito | ............ | 348/663 |
| 6,504,579 B1 * | 1/2003 | Scherrer | ............ | 348/667 |
| 6,995,804 B2 * | 2/2006 | Kwon et al. | ............ | 348/663 |
| 7,133,080 B2 * | 11/2006 | Kobayashi et al. | ............ | 348/663 |
| 7,274,408 B2 * | 9/2007 | Shan et al. | ............ | 348/669 |
| 7,336,321 B2 * | 2/2008 | Suzuki et al. | ............ | 348/663 |
| 7,432,987 B2 * | 10/2008 | Shan et al. | ............ | 348/667 |
| 2004/0201781 A1 | 10/2004 | Kobayashi et al. | | |
| 2005/0030381 A1 | 2/2005 | Tanigawa | | |
| 2006/0176406 A1 * | 8/2006 | Park et al. | ............ | 348/665 |
| 2007/0008432 A1 * | 1/2007 | Chen et al. | ............ | 348/702 |
| 2008/0151105 A1 * | 6/2008 | Kudou | ............ | 348/451 |

* cited by examiner

*Primary Examiner* — Jefferey Harold
*Assistant Examiner* — Mustafizur Rahman

(57) ABSTRACT

A system, apparatus and method are disclosed for separating a current frame of a composite video signal into a luminance signal and a chroma signal. A relative chroma correlation value is generated using a plurality of lines of the current frame. A weighted sum of inter-line pixel differences of the current frame is generated using the relative chroma correlation value. A frame difference signal is generated by subtracting a previous frame of the composite video signal from the current frame. A detected motion signal is generated that corresponds to motion detected in the current frame. The weighted sum of inter-line pixel differences, the frame difference signal, and the detected motion signal are combined to generate the chroma signal. The chroma signal is subtracted from the current frame to generate the luminance signal.

20 Claims, 3 Drawing Sheets

SYSTEM AND METHOD FOR PHASE MOTION DETECTION FOR YC SEPARATION

CROSS-REFERENCE TO RELATED APPLICATION AND CLAIM OF PRIORITY

The present application is related to Singapore Patent Application No. 200809682-8, filed Dec. 31, 2008, entitled "PHASE MOTION DETECTION FOR YC SEPARATION". Singapore Patent Application No. 200809682-8 is assigned to the assignee of the present application and is hereby incorporated by reference into the present disclosure as if fully set forth herein. The present application hereby claims priority under 35 U.S.C. §119(e) to Singapore Patent Application No. 200809682-8.

TECHNICAL FIELD

The present disclosure generally relates to video signal processing, and more particularly to a phase motion detection system for YC separation for image quality improvement.

BACKGROUND

In composite video television systems such as NTSC and PAL, luminance and chrominance information share a portion of the total signal bandwidth. While clean separation between luminance and chrominance is highly desired, current widely used video signal decoders can misinterpret the residues of shared luminance and chrominance after separation, resulting in cross color and dot crawl. Both are highly disturbing artifacts. The term "cross color" refers to corruption of the chrominance spectrum caused by the misinterpretation of high-frequency luminance information as chrominance information. Cross color manifests itself in spectrum of bright colors changing from frame to frame. Conversely, the term "dot crawl" or "cross luminance" refers to corruption of the luminance spectrum by the misinterpretation of chrominance information as high-frequency luminance information. Dot crawl manifests itself in patterned high amplitude noise.

Both artifacts can be reduced by selectively filtering video signals during signal processing. The filtering process usually employs a 3D comb filter comprising at least one line comb filter and at least one frame comb filter. A line comb filter can reduce such artifacts but its effectiveness is limited to artifacts generated by vertical edges and it has a disadvantage of decreasing the vertical resolution. A frame comb filter, on the other hand, provides maximum picture resolution but can only be applied to stationary parts of a picture. To maximize the effectiveness of the comb filters, a highly precise motion detector that can differentiate between the moving and stationary pixels is required.

Conventional arts use a low pass inter-frame difference to generate a motion map to select line comb filters when motion is detected and frame comb filters when there is no motion. Depending on the cut-off frequency of the low pass filter, the performance of the 3D comb filter varies. If the cut-off frequency is high, some motion due to cross luminance may be falsely detected and the 3D comb filter's effectiveness is reduced. If the cut-off frequency is low, motion with higher frequency content may not be detected and motion smearing results. The higher the overlapping of the chrominance with video bandwidth, the more ineffective the motion detection.

Some have improved the performance of motion detection by associating oblique correlation with likelihood of false motion. One disclosed motion detection device including an oblique correlation detection section, motion detection section and motion determination section decreases the sensitivity of motion detection in the presence of an oblique correlation. However, the implementation of the concept using decreased sensitivity in presence of oblique correlation is not sufficient because of the conflict of interests. On one hand, the decreased sensitivity may have impaired the detection of true motion for oblique objects. On the other hand, decreased sensitivity may not be sufficient to prevent false motion detection in mixed color/luminance edges since cross luminance are typically of large amplitudes.

Another example for motion detection uses a plurality of temporal pixels to determine the motion or still status of the video composite signal suitable for use in a 3D comb filter in video decoder. Yet another example for motion detection uses a motion detection circuitry with precise Y motion and C motion detection. The Y motion detection uses the frame difference of line-comb Y signal with chroma level and vertical edge consideration. The C motion detection uses the frame difference of line-comb C signal, together with the frame difference of composite signal and chroma vertical and horizontal correlation computed from the frame-comb Y signals of adjacent lines. Yet another example for motion detection uses a two-frame difference signal that has been filtered to remove chrominance information. The filtering is performed on at least one spatial axis according to the spatial correlation.

Generally, these methods do not consider motion contributed by chroma component because of interfering high frequency luminance at chroma band. However, there exists motion with purely color motion and a misdetection results in color smearing.

Still some use the two-frame difference to detect motion. Although this motion detection considers the contributions from both luminance and chroma, it does not represent the temporal difference between the frames being filtered and may not be sufficient for the PAL standard.

FIG. 1 shows a typical prior art motion detector 700 that is adapted for the PAL standard. The pixel difference $P_{n,n-2}$ between frame n and frame n−2, and the pixel difference $P_{n,n-4}$ between frame n and n−4 are computed by subtractors 701 and 702 respectively. Due to the inverted phase difference between frame n and n−2, a selection by a selector 707 of a vertical low pass filter 705, a horizontal low pass filter 704 and a vertical horizontal low pass filter 703 is performed by a correlator 706 to make the pixel values independent of cross colour. The final motion value is the maximum absolute pixel difference $P_{n,n-2}$ and absolute filtered pixel difference $P_{n,n-4}$.

SUMMARY

Embodiments of the present disclosure generally provide a system and method for phase motion detection for YC separation.

In one embodiment, the present disclosure provides a method for detecting motion in a current frame of a composite video signal. A luminance motion signal is generated using the current frame and a previous frame of the composite video signal. A phase motion signal is generated using the current frame and a plurality of previous frames of the composite video signal. A demodulated phase motion signal is generated using the current frame and the plurality of previous frames. A maximum motion signal is selected among the luminance motion signal, the phase motion signal, and the demodulated phase motion signal. The maximum motion signal is clipped and processed in a multi-pixel horizontal window to generate a final motion signal.

In another embodiment, the present disclosure provides a motion detection system adapted to detect motion in a current frame of a composite video signal. The motion detection system includes a luminance motion detector, a phase motion detector, and a demodulated phase motion detector. The luminance motion detector is adapted to generate a luminance motion signal using the current frame and a previous frame of the composite video signal. The phase motion detector adapted to generate a phase motion signal using the current frame and a plurality of previous frames of the composite video signal. The demodulated phase motion detector adapted to generate a demodulated phase motion signal using the current frame and the plurality of previous frames. The motion detection system also includes a selector that is adapted to select a maximum motion signal among the luminance motion signal, the phase motion signal, and the demodulated phase motion signal. The motion detection system further includes a saturation circuit adapted to clip the maximum motion signal and a 5H-max circuit adapted to process the clipped maximum motion signal in a multi-pixel horizontal window to generate a final motion signal.

In yet another embodiment, the present disclosure provides a luminance and chroma separation circuit adapted to separate a current frame of a composite video signal into a luminance signal and a chroma signal. The luminance and chroma separation circuit includes an inter-line correlator, a line comb, a frame comb, and a motion detector. The inter-line correlator is adapted to generate a relative chroma correlation value using a plurality of lines of the current frame. The line comb is adapted to generate a weighted sum of inter-line pixel differences of the current frame using the relative chroma correlation value. The frame comb is adapted to subtract a previous frame of the composite video signal from the current frame. The motion detector is adapted to detect motion in the current frame and generate a corresponding detected motion signal. The luminance and chroma separation circuit also includes a mixer circuit that is adapted to combine the weighted sum of inter-line pixel differences, an output of the frame comb, and the detected motion signal to generate the chroma signal. The luminance and chroma separation circuit further includes a subtractor that is adapted to subtract the chroma signal from the current frame to generate the luminance signal.

In still another embodiment, the present disclosure provides a method of separating a current frame of a composite video signal into a luminance signal and a chroma signal. A relative chroma correlation value is generated using a plurality of lines of the current frame. A weighted sum of inter-line pixel differences of the current frame is generated using the relative chroma correlation value. A frame difference signal is generated by subtracting a previous frame of the composite video signal from the current frame. A detected motion signal is generated that corresponds to motion detected in the current frame. The weighted sum of inter-line pixel differences, the frame difference signal, and the detected motion signal are combined to generate the chroma signal. The chroma signal is subtracted from the current frame to generate the luminance signal.

In another embodiment, a system includes a composite video source, a luminance output, a chroma output, and a luminance and chroma separation circuit. The luminance and chroma separation circuit is adapted to separate a current frame of a signal received from the composite video source into a luminance signal at the luminance output and a chroma signal at the chroma output. The luminance and chroma separation circuit includes an inter-line correlator, a line comb, a frame comb, and a motion detector. The inter-line correlator is adapted to generate a relative chroma correlation value using a plurality of lines of the current frame. The line comb is adapted to generate a weighted sum of inter-line pixel differences of the current frame using the relative chroma correlation value. The frame comb is adapted to subtract a previous frame of the composite video signal from the current frame. The motion detector is adapted to detect motion in the current frame and generate a corresponding detected motion signal. The luminance and chroma separation circuit also includes a mixer circuit that is adapted to combine the weighted sum of inter-line pixel differences, an output of the frame comb, and the detected motion signal to generate the chroma signal. The luminance and chroma separation circuit further includes a subtractor that is adapted to subtract the chroma signal from the current frame to generate the luminance signal.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
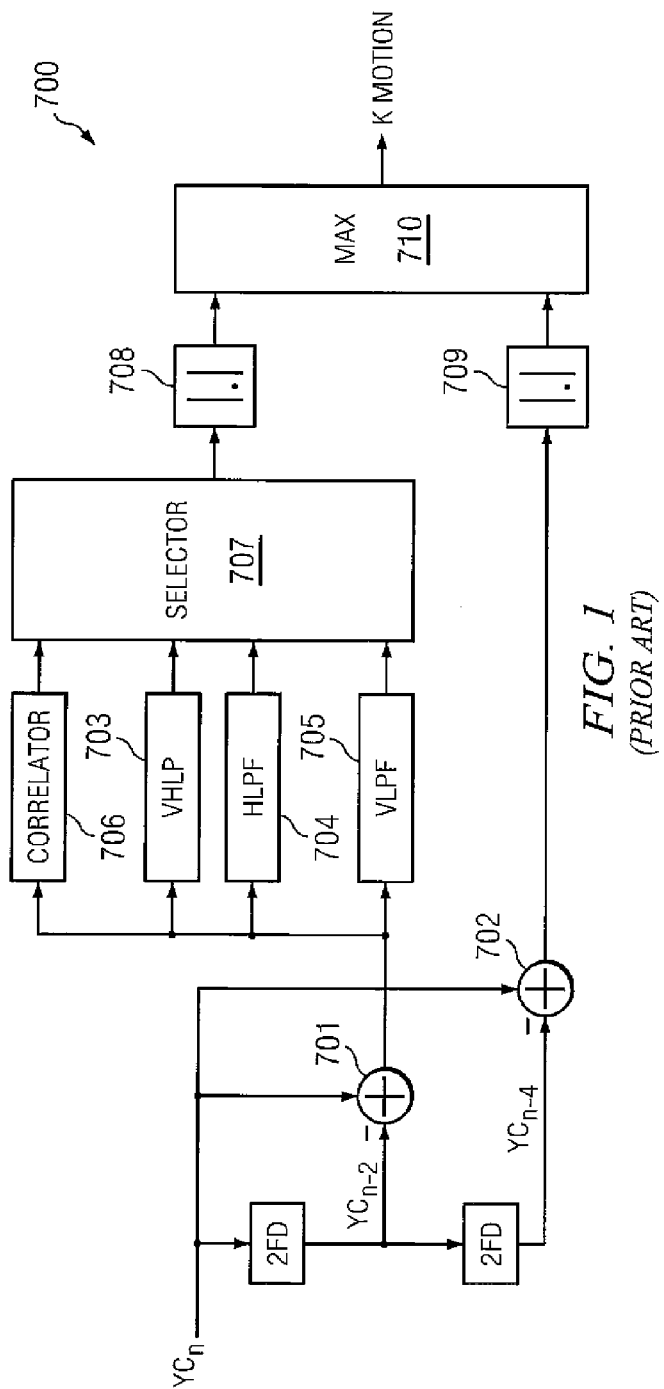
FIG. 1 shows a circuit of a typical prior art motion detector that is adapted for the PAL standard.

The present disclosure provides a comprehensive solution that detects all types of motions including high frequency luminance motion and chroma motion independent of the signal processing done prior to input. In order to detect motion in composite signals, embodiments of the present disclosure provide a motion detection system that includes a luminance motion detector adapted to detect a low frequency luminance motion due to low frequency luminance changes, a phase motion detector adapted to detect the chroma motion due to chroma changes, and a demodulated phase motion detector adapted to detect high frequency luminance motion due to high frequency luminance changes. The functions and operations of each motion detector in a motion detection system according to the disclosure will be described first, followed by a description of a YC separation circuit according to the disclosure.

The luminance motion detector detects precise changes in the low frequency luminance component between frame n and frame n−2 used for the frame comb in the PAL standard. For detection of the low frequency luminance motions, the input signal is first vertically filtered to remove chroma residues, to present best-case line-comb Y signals for difference computation. Then, the difference signal is low-pass filtered to eliminate the possibility of chroma component corruption at high frequency, and the low pass filtered difference signals are used to generate the low frequency luminance motion.

The phase motion detector detects mainly chroma changes from temporally co-located pixels in YC signal. The changes are made independent of chrominance residue in luminance by considering the phase relationship of the YC signal. YC pixels from current frame n, and three previous frames n−1, n−2 and n−3 in the PAL standard are used to determine chroma motion and at least three lines are used. In one embodiment, the phase motion detector provides the differences of chroma motion between frame n and frame n−2 and chroma motion between frame n−1 and n−3. As chroma components U and V are orthogonally modulated in composite signal, chroma motion information for U and V is present only on alternate lines of absolute phase difference. Hence the combined chroma motion for each line takes the maximum between the current chroma phase difference and vertical interpolated chroma phase difference from the top and bottom lines to incorporate motion contributed by quadrature chroma modulation. Alternatively the median or max of the chroma phase difference from the three lines may be taken.

The demodulated motion detector detects mainly high frequency luminance changes from temporally co-located pixels in demodulated U and V signals. The YC signal is first demodulated and low pass filtered to eliminate aliasing effect, generating DU and DV component signal. Output pixels from demodulation circuits of current frame n, and three previous frames n−1, n−2 and n−3 in PAL standard are used to determine high frequency luminance motion. The changes are made independent of luminance residue in chroma by considering the phase relationship of the demodulated signal.

As each of the above detectors has its advantages and limitations, they can be combined constructively to give measures of motion between the frames to be filtered.

Figure 2:
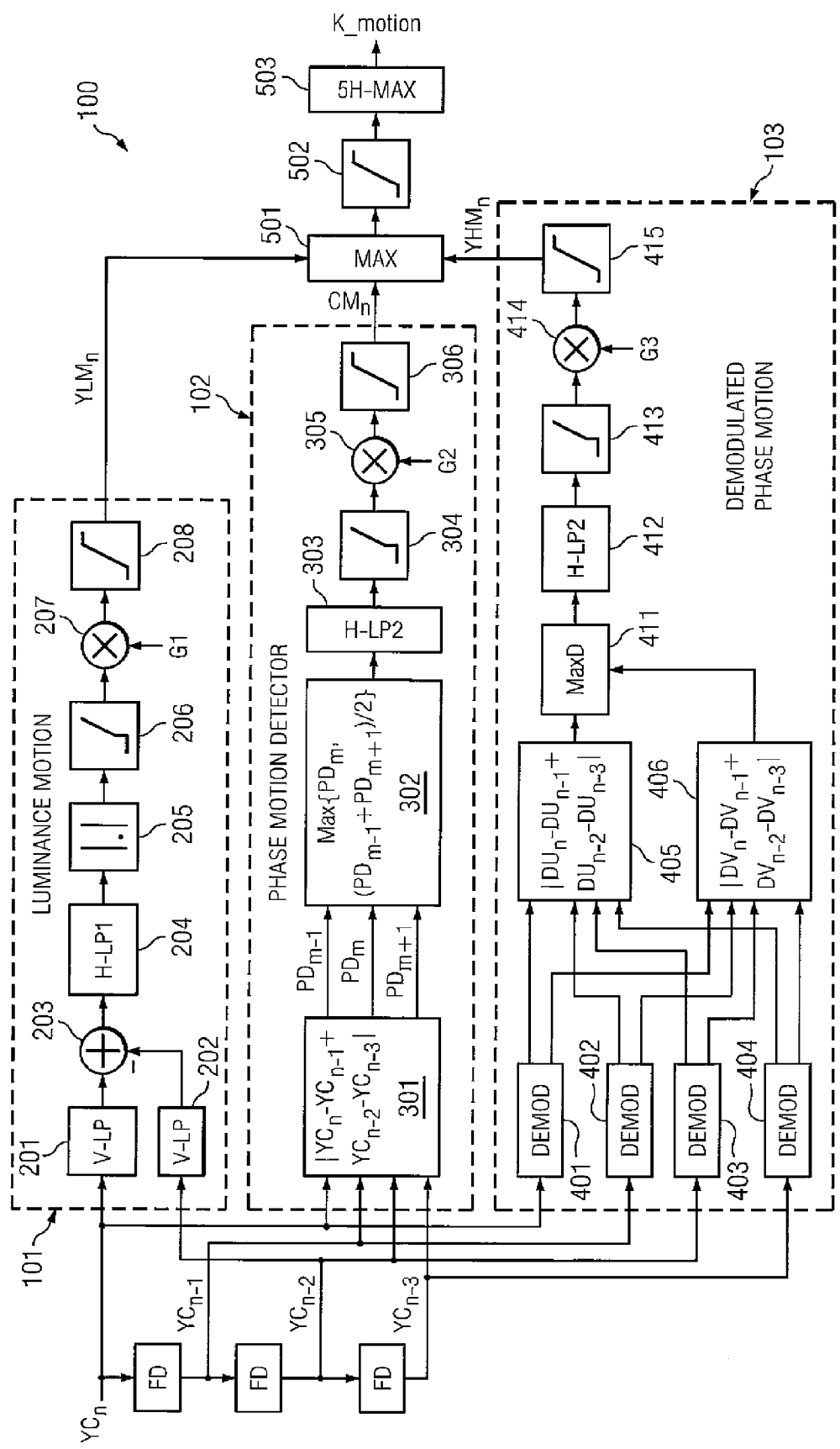
FIG. 2 shows an exemplary circuit of the motion detection system for the PAL standard in accordance with one embodiment of the present disclosure.

Now referring to FIG. 2, there is provided an exemplary circuitry of the motion detection system for the PAL standard in accordance with some embodiments of the present disclosure. As shown in FIG. 2, the motion detection system 100 comprises a luminance motion detector 101 that detects low frequency luminance motion between frame n and n−2, a phase motion detector 102 that detects average difference chroma motion between frames n, n−2, n−1 and n−3, and a demodulated phase motion detector 103 that detects average difference high frequency luminance motion between frames n, n−2, n−1 and n−3. The motion detection system 100 further comprises signal input and frame delay memories for providing signal inputs to the motion detectors. The motion detection system 100 also comprises components including a max circuit 501, a saturation circuit 502, and a 5H-max circuit 503 for deriving the final motion value, K_motion. A more detailed description of the motion detection apparatus will be provided hereinafter.

The luminance motion detector 101 comprises vertical low pass filters 201/202, a subtractor 203 configured to receive outputs from the low pass filters, a horizontal low pass filter 204 configured receive outputs from the subtractor, an absolute circuit 205 configured to receive outputs from the horizontal low pass filter, a coring circuit 206 configured to receive outputs from the absolute circuit, a multiplier 207 configured to receive outputs from the coring circuit, and a saturation circuit 208 configured to receive outputs from the saturation circuit. In order to detect low frequency luminance motion between frame n and frame n−2, the luminance motion detector 101 receives from the signal input $YC_n$ the subsequent line signal $Y_{m+2,n}$, current line signal $Y_{m,n}$, and previous line signal $Y_{m-2,n}$ for the current frame via four luminance line delay memories (not shown). All three line signals are low pass filtered by the vertical low pass filter 201 with coefficients [1 2 1]/4 to cancel out-of-phase chroma signal to generate line-comb signal $YLC_n$. Concurrently, the luminance motion detector 101 receives from the signal input $YC_{n-2}$ the subsequent line signal $Y_{m+2,n-2}$, current line signal $Y_{m,n-2}$ and previous line signal $Y_{m-2,n-2}$, for the previous frame n−2 via two frame delay memories and four additional luminance line delay memories (not shown). The subscript n refers to a frame and m to a line of the video signals. Similarly, all three line signals of frame n−2 are low pass filtered by the vertical low pass filter 202 to cancel out-of-phase chroma signal to generate line-comb signal $YLC_{n-2}$. The line-comb signals $YLC_n$ and $YLC_{n-2}$ may alternatively be the output of line combs of a separation circuitry discussed in detail hereinafter.

These line-comb signals $YLC_n$ and $YLC_{n-2}$ are then subtracted by the subtractor 203 to generate line-comb signal differences. The horizontal low pass filter 204, with low pass frequency characteristics not exceeding the lower end of the overlapping frequency band of chroma and luminance signal or band-stop frequency characteristics attenuating the chroma band, subsequently filters the line-comb signal differences to exclude possible interference of chroma residue. The magnitude of the low pass filtered line-comb signal differences is extracted by the absolute circuit 205 to generate low frequency luminance difference YLD that passes through the coring circuit 206 to eliminate possible noise interference. Finally, the noise-free low frequency luminance difference YLD is multiplied by gain G1 via the multiplier 207, and clipped by the saturation circuit 208 to appropriate motion range to output the low frequency luminance motion YLM.

The phase motion detector 102 comprises a phase difference (PD) computing circuit 301, an enhanced chroma motion values (CD) computing circuit 302 configured to receive outputs from the PD computing circuit, a horizontal low pass filter 303 configured to receive outputs from the CD computing circuit, a coring circuit 304 configured to receive outputs from the horizontal low pass filter, a multiplier 305 configured to receive outputs from the coring circuit, and a saturation circuit 306 configured to receive outputs from the multiplier. In order to detect mainly chroma motion in the presence of luminance, the phase motion detector 102 receives from the signal input the current frame signal $YC_{m,n}$, and a plurality of previous frame signals $YC_{m,n-1}$, $YC_{m,n-2}$, and $YC_{m,n-3}$ via three YC frame delay memories. Then, the received frame signals are used to compute the absolute phase difference values PD via the PD computing circuit 301 according to the following equation (1):

$$\text{absolute\_phase\_difference:} PD_m = |YC_n - YC_{n-1} + YC_{n-2} - YC_{n-3}|; \quad (1)$$

wherein $PD_m$ denotes the absolute phase difference values; $YC_n$, $YC_{n-1}$, $YC_{n-2}$, and $YC_{n-3}$ are sequential frame signals; where m is omitted from all YC components for simplicity Then, the absolute phase difference values $PD_m$, $PD_{m+1}$, and $PD_{m-1}$ from 3 lines are used to compute the enhanced chroma motion values CD via the CD computing circuit 302 according to the below equation (2):

$$\text{chroma\_motion } CD_m = \text{Max}\left\{PD_m, \frac{PD_{m-1} + PD_{m+1}}{2}\right\}; \quad (2)$$

wherein $CD_m$ denotes the enhanced chroma motion values; $PD_{m-1}$, $PD_m$, and $PD_{m+1}$ are the absolute phase difference values for three consecutive lines m−1, m, and m+1. Then the enhanced chroma motion values may be smoothed by the horizontal low pass filter 303, cored through the coring circuit 304, scaled by gain G2 via the multiplier 305, and clipped by saturation circuit 306 to generate the chroma motion signal, CM.

The demodulated phase motion detector 103 complements the above detectors by detecting mainly high frequency luminance motion in the presence of chroma. The demodulated phase motion detector 103 comprises demodulation circuits 401-404, computing circuits 405 and 406 configured to receive outputs from the demodulation circuits, a maxD circuit 411 configured to receive outputs from the computing circuits, a horizontal low pass filter 412 configured to receive outputs from the maxD circuit, a coring circuit 413 configured to receive outputs from the horizontal low pass filter, a multiplier 414 configured to receive outputs from the coring circuit, and a saturation circuit 415 configured to receive outputs from the multiplier.

In order to detect average difference high frequency luminance motion between frames n, n−2, n−1 and n−3, the demodulated phase motion detector 103 receives the current frame signal, $YC_{m,n}$, and a plurality of previous frame signals $YC_{m,n-1}$, $YC_{m,n-2}$, and $YC_{m,n-3}$, via three YC frame delay memories. The YC signals from the frame signals are demodulated the via the demodulation circuits 401-404 to generate two set of signals: $\{DU_{m,n}, DU_{m,n-1}, DU_{m,n-2}, DU_{m,n-3}\}$ and $\{DV_{m,n}, DV_{m,n-1}, DV_{m,n-2}, DV_{m,n-3}\}$. The demodulation process can be relatively simple to extract the U or V components from the composite signals by multiplying an in-phase and out-of-phase sine wave and subsequently employing a low pass filter of chroma bandwidth to eliminate aliasing effect.

The demodulated signals are first combined to compute the absolute phase differences $PDU_m/PDV_m$ in the computing circuits 405, 406 according to below equations (3-4):

$$PDU_m = |DU_{m,n} - DU_{m,n-1} + DU_{m,n-2} - DU_{m,n-3}|; \quad (3)$$

$$PDV_m = |DV_{m,n} - DV_{m,n-1} + DV_{m,n-2} - DV_{m,n-3}|; \quad (4)$$

wherein $PDU_m$ and $PDV_m$ denote the absolute phase differences in chroma components U and V for line m; $DU_{m,n}$, $DU_{m,n-1}$, $DU_{m,n-2}$, and $DU_{m,n-3}$ denote demodulated chroma U signals from frame n, n−1, n−2 and n−3; and $DV_{m,n}$, $DV_{m,n-1}$, $DV_{m,n-2}$, and $DV_{m,n-3}$ denote demodulated V signals from frame n, n−1, n−2 and n−3.

Then, the maxD circuit 411 takes the maximum between the PDU and PDV and duplicates the values to generate the intermediate high frequency luminance motion YHD with same samples as signal YC per line.

The intermediate high frequency luminance motion values may then be smoothed by the horizontal low pass filter 412, cored through the coring circuit 413, scaled by gain G2 via the multiplier 414, and clipped by the saturation circuit 415 to generate the high frequency luminance motion signal, YHM.

For any given video signal, the luminance motion detector 101 generates the low frequency luminance motion YLM, the phase motion detector 102 generates the chroma motion signal CM, and the demodulated phase motion detector 103 outputs the high frequency luminance motion signal YHM. Then the max circuit 501 takes the maximum among these three motion values. The maximum motion value is clipped by the saturation circuit 502, and further processed as the maximum in a 5-pixel horizontal window by the 5H-max circuit 503, resulting in the final motion value, K_motion. In other embodiments, a multi-pixel window of size greater or less than 5 pixels may be used in circuit 503.

The motion detection system and various motion detectors of the present disclosure can be embedded in an YC separation circuitry of a front end composite decoder so as to reduce chroma residue in luminance component and luminance residue in chroma component. The input to the YC separation circuitry is the frequency demodulated video signal in CVBS domain while the outputs are component Y and C signals. The C signal may be subsequently demodulated to generate U and V signals.

Figure 3:
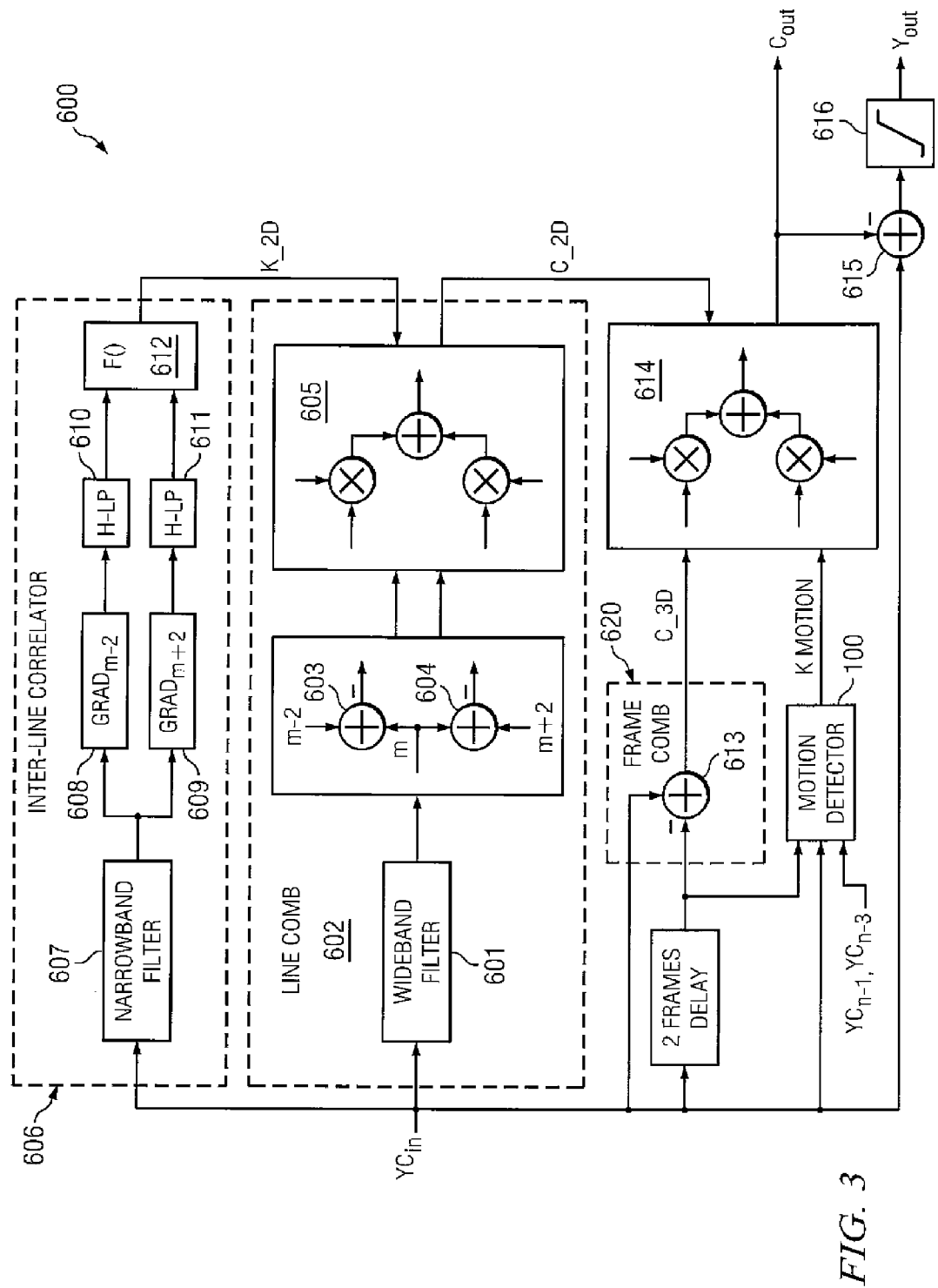
FIG. 3 shows an exemplary YC separation circuit in accordance with one embodiment of the present disclosure.

Now referring to FIG. 3, there is provided an exemplary YC separation circuitry in accordance with one embodiment of the present disclosure. The separation circuitry 600 comprises an inter-line correlator 606, a line comb 602, a frame comb 620, and a motion detector 100. The separation circuitry further comprises components including a subtractor 613, a mixer circuit 614, a subtractor 615, and a saturation circuit 616. The motion detector 100 has been described in detail above. A more detailed description of the separation circuitry 600 will be devoted to other components hereinafter.

The inter-line correlator 606 detects a relative chroma correlation between the current and next line and current and previous line, such that the line comb 602 does not filter across contrasting color regions. The inter-line correlator 606 comprises a narrowband filter 607, gradient circuits 608 and 609 configured to receive outputs from the narrowband filter 607, horizontal low pass filters 610 and 611 configured to receive outputs from the gradient circuits 608 and 609, and a function circuit 612 configured to receive outputs from the horizontal low pass filters 610 and 611.

The narrowband filter 607 isolates the sub-band of the YC interleave frequency band from the YC signal from the signal input $YC_{in}$. The narrowband filter 607 has a smaller bandwidth centered at chroma subcarrier frequency of 4.43 MHz compared to a wideband filter 601 (to be described below) for purposes of less interference from luminance signal. The gradients of current and next line, $G_{x,m,m+2}$, and current and previous line, $G_{x,m,m-2}$, are computed in the gradient circuits 608 and 609 using narrow band-passed YC signals according to below equations (5-6), wherein the narrow band-passed YC signal is represented by YC for simplicity:

$$G_{x,m,m+2} = \max\{|YC_{x+1,m+2} - YC_{x-1,m}|, |YC_{x-1,m+2} - YC_{x+1,m}|\}, \quad (5)$$

$$G_{x,m,m-2} = \max\{|YC_{x+1,m-2} - Y_{x-1,m}|, |YC_{x-1,m-2} - YC_{x+1,m}|\}, \quad (6)$$

wherein $G_{x,m,m+2}$ denotes the gradients of current and next line, and $G_{x,m,m-2}$ the gradients of current and previous line of a sample x; $YC_{x,m}$ refers to the composite signal of sample x and line m.

The gradients are subsequently filtered by the horizontal low pass filters 610 and 611, respectively, for continuity to obtain $G_{m,m+2,1p}$ and $G_{x,m,m-2},1p$. The lower the gradient, the higher the correlation, meaning a higher possibility that the pixels from the two lines belong to the same color region. Thus the line-comb output from two lines having a lower gradient should have a higher contribution towards the final comb value. K_2D is defined as the weight for the line comb filter between the current and previous line in the function circuit 612 according to the below equation (7):

$$K\_2D = \frac{G_{m,m+2,lp}}{G_{m,m+2lp} + G_{m,m-2,lp}} \quad (7)$$

wherein $G_{m,m+2,1p}$ denotes the low passed gradients of current and next line, and $G_{x,m,m-2},1p$ the gradients of current and previous line.

The line comb 602 removes the redundant chroma residue from the Y signal. The line comb 602 comprises a wideband filter 601, subtractors 603 and 604 configured to receive outputs from the wideband filter, and a mixer 605 configured to receive outputs from the subtractors. The line comb 602 receives from the signal input a 3 line input, next line $YC_{m+2,n,wbp}$, current line $YC_{m,n,wbp}$ and previous line $YC_{m-2,n,wbp}$. The wideband filter 601 with frequency response modeling the chroma band in YC signal filters out the low and high frequency signal and retains only the frequency band with interleave Y and C signal. The inter-line differences are computed by the subtractors 603 and 604 and subsequently mixed by the mixer 605 corresponding to K_2D signal from the inter-line correlator 606.

The output of the line comb filter is a weighted sum of inter-line pixel differences and the weights are determined by K_2D. The output can be expressed according to the below equation (8):

$$C\_2D = K\_2D \times (YC_m - YC_{m-2}) + (1 - K\_2D) \times (YC_m - YC_{m+2}); \quad (8)$$

wherein $YC_m$, $YC_{m-2}$ and $YC_{m+2}$ are the composite signals of lines m, m−2 and m+2 respectively.

The frame comb 620 subtracts the previous frame signal $Y_{m,n-1}$ from the current frame signal $Y_{m,n}$ using the subtractor 613 to generate the frame comb output C_3D.

The final clean chroma signal, $C_{out}$, is extracted via the mixer circuit 614 using a weighted sum of line comb output, C_2D, and frame comb output, C_3D. The weights are determined by motion value, K_motion from the motion detector 100. The final clean luminance signal, $Y_{out}$, is generated by subtracting the chroma signal from input YC signal, $YC_{in}$, with the subtractor 615 and clipping the output to defined pixel range with the saturation circuit 616 according to the below equations (9-10):

$$C_{out} = (K\_motion \times C\_2D + (1 - K\_motion) \times C\_3D); \quad (9)$$

$$Y_{out} = YC_{in} - C_{out} \quad (10)$$

wherein K_motion is the motion value, C_2D is the line comb 602 output; C_3D is the frame comb 620 output; $YC_{in}$ is the input composite signal; $C_{out}$ is the output chroma signal; and $Y_{out}$ is the output luminance signal. As may be seen, the output of line comb 602 is weighted by a gain factor that is proportional to K_motion, while the output of the frame comb 620 is weighted by a gain factor that is inversely proportional to K_motion.

Embodiments of the present disclosure are useful for component video with cross color and cross luminance noise. More specifically, embodiments of the present disclosure include high frequency luminance motion detection and chroma motion detection between specific frames to be temporally filtered. The embodiments are able to detect motion independent of the interference noise from other video components using phase relationship such that residual cross component can be reduced by a simple line and frame comb architecture to provide cleaner output signals. In addition, embodiments of the present disclosure have good coverage of different frequencies and component motion for increased robustness of motion detection.

Embodiments of the present disclosure operate such that the inputs are not temporally filtered in the presence of motion and are temporally filtered in the absence of motion, generating clean Y and C signals with reduction of cross color and dot crawl and generating minimally modified signals in the absence of such artifacts.

Figure 4:
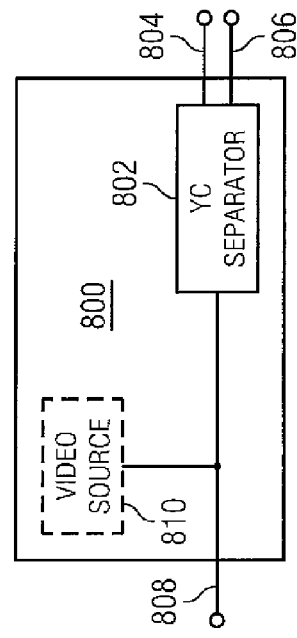
FIG. 4 shows a block diagram of a video device employing a YC separation circuit according to the present disclosure.

An application of the present disclosure to an end consumer product is shown in FIG. 4. A video device 800 includes a YC separation circuit 802 according to the present disclosure. The YC separation circuit 802 generates a chroma signal output 804 and a luminance signal output 806. In some embodiments, a video input 808 provides a composite video source for the YC separation circuit 802. In other embodiments, the composite input to the YC separation circuit 802 may be received from an internal video source 810, such as an RF demodulator of a television receiver or an analog cable set-top box, or other suitable composite video source. In still other embodiments the video device 800 may have both the composite video input 808 and the composite video source 810. In such embodiments, the video device 800 includes a switch (not shown in FIG. 4) to select between the composite video input 808 and the composite video source 810.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for detecting motion for YC separation in a current frame of a composite video signal, the method comprising:
   generating a luminance motion signal using the current frame and a previous frame of the composite video signal;
   generating a phase motion signal using the current frame and a plurality of previous frames of the composite video signal;
   generating a demodulated phase motion signal using the current frame and the plurality of previous frames of the composite video signal;
   selecting a maximum motion signal among the luminance motion signal, the phase motion signal, and the demodulated phase motion signal;
   clipping the maximum motion signal; and
   processing the clipped maximum motion signal in a multi-pixel horizontal window to generate a final motion signal.

2. The method of claim 1, wherein generating a luminance motion signal using the current frame and a previous frame further comprises:
   low pass filtering three lines of the current frame;
   low pass filtering three corresponding lines of the previous frame;
   subtracting the low pass filtered lines of the previous frame from the low pass filtered lines of the current frame to generate line-comb signal difference values;
   horizontal low pass filtering the line-comb signal difference values;
   generating a low frequency luminance difference by extracting a magnitude of the low pass filtered line-comb signal difference values;
   coring the low frequency luminance difference;

scaling the cored low frequency luminance difference by a gain factor; and clipping the scaled cored low frequency luminance difference to generate the luminance motion signal.

3. The method of claim 1, wherein generating a phase motion signal using the current frame and a plurality of previous frames of the composite video signal further comprises:

computing absolute phase difference values using the current frame and the plurality of previous frames;

computing chroma motion values using the absolute phase difference values;

smoothing the chroma motion values;

coring the smoothed chroma motion values;

scaling the cored smoothed chroma motion values by a gain factor; and clipping the scaled cored smoothed chroma motion values to generate the phase motion signal.

4. The method of claim 1, wherein generating a demodulated phase motion signal using the current frame and the plurality of previous frames of the composite video signal further comprises:

demodulating the current frame and the plurality of previous frames to generate first and second sets of chroma signals;

generating first and second absolute phase difference signals from the first and second sets of chroma signals, respectively;

generating an intermediate high frequency luminance motion signal by selecting a maximum signal between the first and second absolute phase difference signals;

smoothing the intermediate high frequency luminance motion signal;

coring the smoothed intermediate high frequency luminance motion signal;

scaling the cored smoothed intermediate high frequency luminance motion signal by a gain factor; and clipping the scaled cored smoothed intermediate high frequency luminance motion signal to generate the demodulated phase motion signal.

5. A motion detection system adapted to detect motion in a current frame of a composite video signal, the motion detection system comprising:

a luminance motion detector adapted to generate a luminance motion signal using the current frame and a previous frame of the composite video signal;

a phase motion detector adapted to generate a phase motion signal using the current frame and a plurality of previous frames of the composite video signal;

a demodulated phase motion detector adapted to generate a demodulated phase motion signal using the current frame and the plurality of previous frames of the composite video signal;

a selector adapted to select a maximum motion signal among the luminance motion signal, the phase motion signal, and the demodulated phase motion signal;

a saturation circuit adapted to clip the maximum motion signal; and a circuit adapted to process the clipped maximum motion signal in a multi-pixel horizontal window to generate a final motion signal.

6. The motion detection system of claim 5, wherein the luminance motion detector comprises:

a first low pass filter adapted to filter three lines of the current frame;

a second low pass filter adapted to filter three corresponding lines of the previous frame;

a subtractor adapted to subtract an output of the second low pass filter from an output of the first low pass filter;

a horizontal low pass filter adapted to filter an output of the subtractor;

an absolute circuit adapted to extracting a magnitude of an output of the horizontal low pass filter;

a coring circuit adapted to core an output of the absolute circuit;

a scaling circuit adapted to scale an output of the coring circuit by a gain factor; and a saturation circuit adapted to clip an output of the scaling circuit to generate the luminance motion signal.

7. The motion detection system of claim 5, wherein the phase motion detector comprises:

a phase difference circuit adapted to compute absolute phase difference values using the current frame and the plurality of previous frames;

a chroma motion values circuit adapted to compute chroma motion values using the absolute phase difference values;

a horizontal low pass filter adapted to smooth the chroma motion values;

a coring circuit adapted to core the smoothed chroma motion values;

a scaling circuit adapted to scale the cored smoothed chroma motion values by a gain factor; and a saturation circuit adapted to clip the scaled cored smoothed chroma motion values to generate the phase motion signal.

8. The motion detection system of claim 5, wherein the demodulated phase motion detector comprises:

a plurality of demodulation circuits adapted to demodulate the current frame and the plurality of previous frames to generate first and second sets of chroma signals;

first and second absolute phase difference circuits adapted to generate first and second absolute phase difference signals from the first and second sets of chroma signals, respectively;

a selector adapted to select a maximum signal between the first and second absolute phase difference signals;

a horizontal low pass filter adapted to smooth an output of the selector;

a coring circuit adapted to core an output of the horizontal low pass filter;

a scaling circuit adapted to scale an output of the coring circuit; and a saturation circuit adapted to clip an output of the scaling circuit to generate the demodulated phase motion signal.

9. A luminance and chroma separation circuit adapted to separate a current frame of a composite video signal into a luminance signal and a chroma signal, the luminance and chroma separation circuit comprising:

an inter-line correlator adapted to generate a relative chroma correlation value using a plurality of lines of the current frame;

a line comb adapted to generate a weighted sum of inter-line pixel differences of the current frame using the relative chroma correlation value;

a frame comb adapted to subtract a previous frame of the composite video signal from the current frame;

a motion detector adapted to detect motion in the current frame and generate a corresponding detected motion signal;

a mixer circuit adapted to combine the weighted sum of inter-line pixel differences, an output of the frame comb, and the detected motion signal to generate the chroma signal; and a subtractor adapted to subtract the chroma signal from the current frame to generate the luminance signal.

10. The luminance and chroma separation circuit of claim 9, wherein the inter-line correlator comprises:
- a narrowband filter adapted to pass a sub-band of a luminance and chroma interleave frequency band of the current frame;
- a first gradient circuit adapted to generate a gradient of a current line and a previous line of an output of the narrowband filter;
- a second gradient circuit adapted to generate a gradient of the current line and a subsequent line of the output of the narrowband filter;
- a first horizontal low pass filter adapted to filter an output of the first gradient circuit;
- a second horizontal low pass filter adapted to filter an output of the second gradient circuit; and
- a function circuit adapted to generate the relative chroma correlation value using an output of the first horizontal low pass filter and an output of the second horizontal low pass filter.

11. The luminance and chroma separation circuit of claim 9, wherein the line comb comprises:
- a wideband filter adapted to pass a luminance and chroma interleave frequency band of the current frame;
- a first subtractor adapted to compute a difference between a current line and a previous line of an output of the wideband filter;
- a second subtractor adapted to compute a difference between the current line and a subsequent line of the output of the wideband filter; and
- a mixer adapted to weight outputs of the first and second subtractors using the relative chroma correlation value and combine the weighted outputs to generate the weighted sum of inter-line pixel differences.

12. The luminance and chroma separation circuit of claim 9, wherein the motion detector comprises:
- a luminance motion detector adapted to generate a luminance motion signal using the current frame signal and a previous frame signal of the composite video signal;
- a phase motion detector adapted to generate a phase motion signal using the current frame signal and a plurality of previous frame signals of the composite video signal;
- a demodulated phase motion detector adapted to generate a demodulated phase motion signal using the current frame signal and the plurality of previous frame signals of the composite video signal;
- a selector adapted to select a maximum motion signal among the luminance motion signal, the phase motion signal, and the demodulated phase motion signal; and
- a circuit adapted to process the maximum motion signal to generate the detected motion signal.

13. A method of separating a current frame of a composite video signal into a luminance signal and a chroma signal, the method comprising:
- generating a relative chroma correlation value using a plurality of lines of the current frame;
- generating a weighted sum of inter-line pixel differences of the current frame using the relative chroma correlation value;
- generating a frame difference signal by subtracting a previous frame of the composite video signal from the current frame;
- generating a detected motion signal corresponding to motion detected in the current frame;
- combining the weighted sum of inter-line pixel differences, the frame difference signal, and the detected motion signal to generate the chroma signal; and
- subtracting the chroma signal from the current frame to generate the luminance signal.

14. The method of claim 13, where generating a relative chroma correlation value using a plurality of lines of the current frame further comprises:
- narrowband filtering the current frame to pass a sub-band of a luminance and chroma interleave frequency band;
- generating a first gradient of a current line and a previous line of the filtered current frame;
- generating a second gradient of the current line and a subsequent line of the filtered current frame;
- horizontal low pass filtering the first gradient;
- horizontal low pass filtering the second gradient; and
- generating the relative chroma correlation value using the filtered first and second gradients by dividing the filtered second gradient by a sum of the filtered first and second gradients.

15. The method of claim 13, wherein generating a weighted sum of inter-line pixel differences of the current frame using the relative chroma correlation value further comprises:
- wideband filtering the current frame to pass a luminance and chroma interleave frequency band;
- computing a first difference between a current line and a previous line of the filtered current frame;
- computing a second difference between the current line and a subsequent line of the filtered current frame;
- weighting the first and second differences using the relative chroma correlation value; and
- combining the weighted first and second differences to generate the weighted sum of inter-line pixel differences.

16. The method of claim 13, wherein generating a detected motion signal corresponding to motion detected in the current frame further comprises
- generating a luminance motion signal using the current frame and a previous frame of the composite video signal;
- generating a phase motion signal using the current frame and a plurality of previous frames of the composite video signal;
- generating a demodulated phase motion signal using the current frame and the plurality of previous frames of the composite video signal;
- selecting a maximum motion signal among the low frequency luminance motion signal, the average difference chroma motion signal, and the average difference high frequency luminance motion signal; and
- generating the detected motion signal using the maximum motion signal.

17. A system, comprising:
- a composite video source;
- a luminance output;
- a chroma output; and
- a luminance and chroma separation circuit adapted to separate a current frame of a signal received from the composite video source into a luminance signal at the luminance output and a chroma signal at the chroma output, the luminance and chroma separation circuit comprising:
  - an inter-line correlator adapted to generate a relative chroma correlation value using a plurality of lines of the current frame;

a line comb adapted to generate a weighted sum of inter-line pixel differences of the current frame using the relative chroma correlation value;

a frame comb adapted to subtract a previous frame of the composite video signal from the current frame;

a motion detector adapted to detect motion in the current frame and generate a corresponding detected motion signal;

a mixer circuit adapted to combine the weighted sum of inter-line pixel differences, an output of the frame comb, and the detected motion signal to generate the chroma signal; and a subtractor adapted to subtract the chroma signal from the current frame to generate the luminance signal.

18. The system of claim 17, wherein the motion detector comprises:

a luminance motion detector adapted to generate a luminance motion signal using the current frame signal and a previous frame signal of the signal received from the composite video source;

a phase motion detector adapted to generate a phase motion signal using the current frame signal and a plurality of previous frame signals of the signal received from the composite video source;

a demodulated phase motion detector adapted to generate a demodulated phase motion signal using the current frame signal and the plurality of previous frame signals of the signal received from the composite video source;

a selector adapted to select a maximum motion signal among the low frequency luminance motion signal, the average difference chroma motion signal, and the average difference high frequency luminance motion signal; and a circuit adapted to process the maximum motion signal to generate the detected motion signal.

19. The system of claim 17, wherein the composite video source comprises a composite video input.

20. The system of claim 17, wherein the mixer circuit scales the weighted sum of inter-line pixel differences by a first gain factor that is proportional to the detected motion signal and scales the output of the frame comb by a second gain factor that is inversely proportional to the detected motion signal.

* * * * *